United States Patent
Park

(10) Patent No.: US 11,689,999 B2
(45) Date of Patent: Jun. 27, 2023

(54) METHOD AND APPARATUS FOR PERFORMING INITIAL ACCESS IN LIMITED BANDWIDTH

(71) Applicant: KT CORPORATION, Gyeonggi-do (KR)

(72) Inventor: Ki-Hyeon Park, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 17/371,796

(22) Filed: Jul. 9, 2021

(65) Prior Publication Data

US 2022/0015019 A1 Jan. 13, 2022

(30) Foreign Application Priority Data

Jul. 10, 2020 (KR) .......... 10-2020-0085622
Jun. 24, 2021 (KR) .......... 10-2021-0082351

(51) Int. Cl.
*H04W 72/04* (2023.01)
*H04W 48/16* (2009.01)
*H04W 74/08* (2009.01)

(52) U.S. Cl.
CPC .......... *H04W 48/16* (2013.01); *H04W 72/04* (2013.01); *H04W 74/0833* (2013.01)

(58) Field of Classification Search
CPC ...... H04W 72/04; H04W 72/02; H04W 74/00
See application file for complete search history.

(56) References Cited

U.S. PATENT DOCUMENTS

2019/0149421 A1* 5/2019 Jin ............ H04W 36/125
370/331

FOREIGN PATENT DOCUMENTS

GB 2530566 A * 3/2016 .......... H04L 1/1896

OTHER PUBLICATIONS

Oppo, "Discussion on UE complexity reduction", R1-2004104, 3GPP TSG RAN WG1 #101, e-Meeting, May 25-Jun. 5, 2020.
Xiaomi, "Initial discussion on the complexity reduction for reduced capability device", R1-2004506, 3GPP TSG RAN WG1 #101, e-Meeting, May 25-Jun. 5, 2020.
Huawei et al., "Other aspects for reduced capability devices", R1-2004612, 3GPP TSG RAN WG1 Meeting #101-e, E-meeting, May 25-Jun. 5, 2020.
Ericsson, "Random access for Rel-13 low complexity and enhanced coverage UEs", Tdoc R2-153717, 3GPP TSG-RAN WG2 #91, Beijing, P.R. China, Aug. 24-28, 2015.
European Patent Office, European Search Report of corresponding EP Patent Application No. 21184747.0, dated Dec. 8, 2021.

* cited by examiner

*Primary Examiner* — Kevin Kim
(74) *Attorney, Agent, or Firm* — IP Legal Services, LLC

(57) ABSTRACT

Provided are a method and an apparatus for performing an initial access in a limited bandwidth. The method of a user equipment (UE) for performing an initial access in a limited bandwidth may include receiving at least one of i) first configuration information which is configured for a UE having a limited bandwidth in which an available bandwidth is narrower than a predetermined bandwidth and ii) second configuration information which is configured for a UE having the predetermined bandwidth, and performing an initial access based on one of the first configuration information and the second configuration information.

12 Claims, 13 Drawing Sheets

METHOD AND APPARATUS FOR PERFORMING INITIAL ACCESS IN LIMITED BANDWIDTH

CROSS REFERENCE TO RELATED APPLICATION

This application claims priority from Korean Patent Application No. 10-2020-0085622 filed on Jul. 10, 2020 and Korean Patent Application No. 10-2021-0082351 filed on Jun. 24, 2021, both of which are hereby incorporated by reference for all purposes as if fully set forth herein.

BACKGROUND

Field

The present disclosure relates to a method and apparatus for performing an initial access in a limited bandwidth in a next-generation radio access network (hereinafter, referred to as "new radio or NR").

Description of Related Art

Recently, the 3rd generation partnership project (3GPP) has approved the "Study on New Radio Access Technology", which is a study item for research on next-generation/5G radio access technology (hereinafter, referred to as "new radio" or "NR"). On the basis of the Study on New Radio Access Technology, Radio Access Network Working Group 1 (RAN WG1) has been discussing frame structures, channel coding and modulation, waveforms, multiple access methods, and the like for the new radio (NR). It is required to design NR not only to provide an improved data transmission rate as compared with the long term evolution (LTE)/LTE-Advanced, but also to meet various requirements in detailed and specific usage scenarios.

An enhanced mobile broadband (eMBB), massive machine-type communication (mMTC), and ultra-reliable and low latency communication (URLLC) are proposed as representative usage scenarios of NR. In order to meet the requirements of the individual scenarios, it is required to design NR to have flexible frame structures, compared with the LTE/LTE-Advanced.

Because the requirements for data rates, latency, reliability, coverage, etc. are different from each other, there is a need for a method for efficiently multiplexing a radio resource unit based on different numerologies from other (e.g., subcarrier spacing, sub-frame, Transmission Time Interval (TTI), etc.) as a method for efficiently satisfying each usage scenario requirement through a frequency band constituting any NR system.

In consideration of this aspect, it is necessary to design the initial access for a terminal having a reduced capability in NR.

BRIEF SUMMARY

The present disclosure provides a method and apparatus for performing an initial access in a limited bandwidth with respect to a user equipment (UE) having the limited bandwidth in which an available bandwidth is narrower than a predetermined bandwidth.

According to one aspect, a method of a user equipment (UE) may be provided for performing an initial access in a limited bandwidth. The method includes receiving at least one of i) first configuration information which is configured for a UE having a limited bandwidth in which an available bandwidth is narrower than a predetermined bandwidth and ii) second configuration information which is configured for a UE having the predetermined bandwidth, and performing an initial access based on one of the first configuration information and the second configuration information.

According to another aspect, a method of a base station may be provided for performing an initial access in a limited bandwidth. The method includes transmitting at least one of i) first configuration information which is configured for a UE having a limited bandwidth in which an available bandwidth is narrower than a predetermined bandwidth and ii) second configuration information which is configured for a UE having the predetermined bandwidth, and performing an initial access based on one of the first configuration information and the second configuration information.

According to still another aspect, a user equipment (UE) may be provided for performing an initial access in a limited bandwidth. The user equipment includes a receiver configured to receive at least one of i) first configuration information which is configured for a UE having a limited bandwidth in which an available bandwidth is narrower than a predetermined bandwidth and ii) second configuration information which is configured for a UE having the predetermined bandwidth, and a controller configured to perform an initial access based on one of the first configuration information and the second configuration information.

According to still another aspect, a base station may be provided for performing an initial access in a limited bandwidth. The base station includes a transmitter configured to transmit at least one of i) first configuration information which is configured for a UE having a limited bandwidth in which an available bandwidth is narrower than a predetermined bandwidth and ii) second configuration information which is configured for a UE having the predetermined bandwidth, and a controller configured to perform an initial access based on one of the first configuration information and the second configuration information.

According to the disclosed embodiments, it is possible to perform an initial access in a limited bandwidth with respect to a UE having the limited bandwidth in which an available bandwidth is narrower than a predetermined bandwidth.

DESCRIPTION OF DRAWINGS

The above and other aspects, features, and advantages of the present disclosure will be more apparent from the following detailed description taken in conjunction with the accompanying drawings, in which.

DETAILED DESCRIPTION

Figure 1:
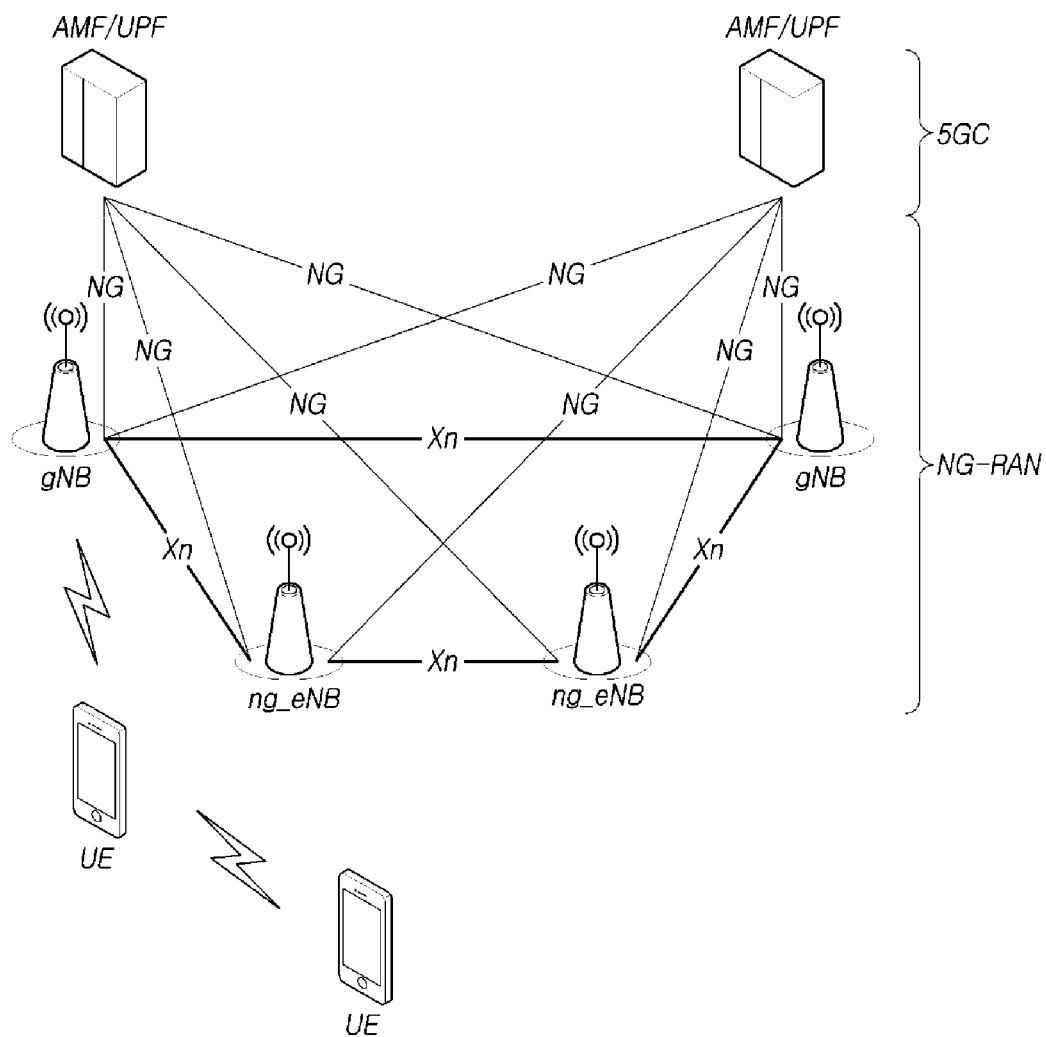
FIG. 1 is a view schematically illustrating an NR wireless communication system in accordance with embodiments of the present disclosure.

Hereinafter, some embodiments of the present disclosure will be described in detail with reference to the accompanying illustrative drawings. In the drawings, like reference numerals are used to denote like elements throughout the drawings, even if they are shown on different drawings. Further, in the following description of the present disclosure, a detailed description of known functions and configurations incorporated herein will be omitted when it may make the subject matter of the present disclosure rather unclear. When the expression "include", "have", "comprise", or the like as mentioned herein is used, any other part may be added unless the expression "only" is used. When an element is expressed in the singular, the element may cover the plural form unless a special mention is explicitly made of the element.

In addition, terms, such as first, second, A, B, (A), (B) or the like may be used herein when describing components of the present disclosure. Each of these terminologies is not used to define an essence, order or sequence of a corresponding component but used merely to distinguish the corresponding component from other component(s).

In describing the positional relationship between components, if two or more components are described as being "connected", "combined", or "coupled" to each other, it should be understood that two or more components may be directly "connected", "combined", or "coupled" to each other, and that two or more components may be "connected", "combined", or "coupled" to each other with another component "interposed" therebetween. In this case, another component may be included in at least one of the two or more components that are "connected", "combined", or "coupled" to each other.

In the description of a sequence of operating methods or manufacturing methods, for example, the expressions using "after", "subsequent to", "next", "before", and the like may also encompass the case in which operations or processes are performed discontinuously unless "immediately" or "directly" is used in the expression.

Numerical values for components or information corresponding thereto (e.g., levels or the like), which are mentioned herein, may be interpreted as including an error range caused by various factors (e.g., process factors, internal or external impacts, noise, etc.) even if an explicit description thereof is not provided.

The wireless communication system in the present specification refers to a system for providing various communication services, such as a voice service and a data service, using radio resources. The wireless communication system may include a user equipment (UE), a base station, a core network, and the like.

Embodiments disclosed below may be applied to a wireless communication system using various radio access technologies. For example, the embodiments may be applied to various radio access technologies such as code division multiple access (CDMA), frequency division multiple access (FDMA), time division multiple access (TDMA), orthogonal frequency division multiple access (OFDMA), single-carrier frequency division multiple access (SC-FDMA), non-orthogonal multiple access (NOMA), or the like. In addition, the radio access technology may refer to respective generation communication technologies established by various communication organizations, such as 3GPP, 3GPP2, WiFi, Bluetooth, IEEE, ITU, or the like, as well as a specific access technology. For example, CDMA may be implemented as a wireless technology such as universal terrestrial radio access (UTRA) or CDMA2000. TDMA may be implemented as a wireless technology such as global system for mobile communications (GSM)/general packet radio service (GPRS)/enhanced data rates for GSM evolution (EDGE). OFDMA may be implemented as a wireless technology such as IEEE (Institute of Electrical and Electronics Engineers) 802.11 (Wi-Fi), IEEE 802.16 (WiMAX), IEEE 802-20, evolved UTRA (E-UTRA), and the like. IEEE 802.16m is evolution of IEEE 802.16e, which provides backward compatibility with systems based on IEEE 802.16e. UTRA is a part of a universal mobile telecommunications system (UMTS). 3GPP (3rd-generation partnership project) LTE (long-term evolution) is a part of E-UMTS (evolved UMTS) using evolved-UMTS terrestrial radio access (E-UTRA), which adopts OFDMA in a downlink and SC-FDMA in an uplink. As described above, the embodiments may be applied to radio access technologies that have been launched or commercialized. Further, the embodiments may be applied to radio access technologies that are being developed or will be developed in the future.

The UE used in the specification must be interpreted as a broad meaning that indicates a device including a wireless communication module that communicates with a base station in a wireless communication system. For example, the UE includes user equipment (UE) in WCDMA, LTE, NR, HSPA, IMT-2020 (5G or New Radio), and the like, a mobile station in GSM, a user UE (UT), a subscriber station (SS), a wireless device, and the like. In addition, the UE may be a portable user device, such as a smart phone, or the UE may be a vehicle, a device including a wireless communication module in the vehicle, and the like in a V2X communication system according to the usage type thereof. In the case of a machine-type communication (MTC) system, the UE may refer to an MTC UE, an M2M UE, or a URLLC UE, which employs a communication module capable of performing machine-type communication.

A base station or a cell in the present specification refers to an end that communicates with a UE through a network and encompasses various coverage regions such as a Node-B, an evolved Node-B (eNB), a gNode-B, a low-power node (LPN), a sector, a site, various types of antennas, a base transceiver system (BTS), an access point, a point (e.g., a transmission point, a reception point, or a transmission/reception point), a relay node, a megacell, a macrocell, a microcell, a picocell, a femtocell, a remote radio head (RRH), a radio unit (RU), a small cell, and the like. In addition, the cell may be used as a meaning including a bandwidth part (BWP) in the frequency domain. For example, the serving cell may refer to an active BWP of a UE.

The various cells listed above are provided with a base station controlling one or more cells, and the base station may be interpreted as two meanings. The base station may be 1) a device for providing a megacell, a macrocell, a microcell, a picocell, a femtocell, or a small cell in connection with a wireless region, or the base station may be 2) a wireless region itself. In the above description 1), the base station may be the devices controlled by the same entity and providing predetermined wireless regions or all devices interacting with each other and cooperatively configuring a wireless region. For example, the base station may be a point, a transmission/reception point, a transmission point, a reception point, and the like according to the configuration method of the wireless region. In the above description 2), the base station may be the wireless region in which a user equipment (UE) may be enabled to transmit data to and receive data from the other UE or a neighboring base station.

In this specification, the cell may refer to coverage of a signal transmitted from a transmission/reception point, a component carrier having coverage of a signal transmitted from a transmission/reception point (or a transmission point), or a transmission/reception point itself.

An uplink (UL) refers to a scheme of transmitting data from a UE to a base station, and a downlink (DL) refers to a scheme of transmitting data from a base station to a UE. The downlink may mean communication or communication paths from multiple transmission/reception points to a UE, and the uplink may mean communication or communication paths from a UE to multiple transmission/reception points. In the downlink, a transmitter may be a part of the multiple transmission/reception points, and a receiver may be a part of the UE. In addition, in the uplink, the transmitter may be a part of the UE, and the receiver may be a part of the multiple transmission/reception points.

The uplink and downlink transmit and receive control information over a control channel, such as a physical downlink control channel (PDCCH) and a physical uplink control channel (PUCCH). The uplink and downlink transmit and receive data over a data channel such as a physical downlink shared channel (PDSCH) and a physical uplink shared channel (PUSCH). Hereinafter, the transmission and reception of a signal over a channel, such as PUCCH, PUSCH, PDCCH, PDSCH, or the like, may be expressed as "PUCCH, PUSCH, PDCCH, PDSCH, or the like is transmitted and received".

For the sake of clarity, the following description will focus on 3GPP LTE/LTE-A/NR (New Radio) communication systems, but technical features of the disclosure are not limited to the corresponding communication systems.

3GPP has been developing a 5G (5th-Generation) communication technology in order to meet the requirements of a next-generation radio access technology of ITU-R after studying 4G (4th-generation) communication technology. Specifically, 3GPP is developing, as a 5G communication technology, LTE-A pro by improving the LTE-Advanced technology so as to conform to the requirements of ITU-R and a new NR communication technology that is totally different from 4G communication technology. LTE-A pro and NR all refer to the 5G communication technology. Hereinafter, the 5G communication technology will be described on the basis of NR unless a specific communication technology is specified.

Various operating scenarios have been defined in NR in consideration of satellites, automobiles, new verticals, and the like in the typical 4G LTE scenarios so as to support an enhanced mobile broadband (eMBB) scenario in terms of services, a massive machine-type communication (mMTC) scenario in which UEs spread over a broad region at a high UE density, thereby requiring low data rates and asynchronous connections, and an ultra-reliability and low-latency (URLLC) scenario that requires high responsiveness and reliability and supports high-speed mobility.

In order to satisfy such scenarios, NR introduces a wireless communication system employing a new waveform and frame structure technology, a low-latency technology, a super-high frequency band (mmWave) support technology, and a forward compatible provision technology. In particular, the NR system has various technological changes in terms of flexibility in order to provide forward compatibility. The primary technical features of NR will be described below with reference to the drawings.

<Overview of NR System>

FIG. 1 is a view schematically illustrating an NR system.

Referring to FIG. 1, the NR system is divided into a 5G core network (5GC) and an NG-RAN part. The NG-RAN includes gNBs and ng-eNBs providing user plane (SDAP/PDCP/RLC/MAC/PHY) and user equipment (UE) control plane (RRC) protocol ends. The gNBs or the gNB and the ng-eNB are connected to each other through Xn interfaces. The gNB and the ng-eNB are connected to the 5GC through NG interfaces, respectively. The 5GC may be configured to include an access and mobility management function (AMF) for managing a control plane, such as a UE connection and mobility control function, and a user plane function (UPF) controlling user data. NR supports both frequency bands below 6 GHz (frequency range 1 FR1 FR1) and frequency bands equal to or greater than 6 GHz (frequency range 2 FR2 FR2).

The gNB denotes a base station that provides a UE with an NR user plane and control plane protocol end. The ng-eNB denotes a base station that provides a UE with an E-UTRA user plane and control plane protocol end. The base station described in the present specification should be understood as encompassing the gNB and the ng-eNB. However, the base station may be also used to refer to the gNB or the ng-eNB separately from each other, as necessary.

<NR Waveform, Numerology, and Frame Structure>

NR uses a cyclic prefix (CP)-OFDM waveform using a cyclic prefix for downlink transmission and uses CP-OFDM or discrete Fourier transform spread (DFT)-s-OFDM for uplink transmission. OFDM technology is easy to combine with a multiple-input multiple-output (MIMO) scheme and allows a low-complexity receiver to be used with high frequency efficiency.

Since the three scenarios described above have different requirements for data rates, delay rates, coverage, and the like from each other in NR, it is necessary to efficiently satisfy the requirements for each scenario over frequency bands constituting the NR system. To this end, a technique for efficiently multiplexing radio resources based on a plurality of different numerologies has been proposed.

Specifically, the NR transmission numerology is determined on the basis of subcarrier spacing and a cyclic prefix (CP). As shown in Table 1 below, "µ" is used as an exponential value of 2 so as to be changed exponentially on the basis of 15 kHz.

TABLE 1

| µ | Subcarrier spacing | Cyclic prefix | Supported for data | Supported for synch |
|---|---|---|---|---|
| 0 | 15 | Normal | Yes | Yes |
| 1 | 30 | Normal | Yes | Yes |

TABLE 1-continued

| μ | Subcarrier spacing | Cyclic prefix | Supported for data | Supported for synch |
|---|---|---|---|---|
| 2 | 60 | Normal, Extended | Yes | No |
| 3 | 120 | Normal | Yes | Yes |
| 4 | 240 | Normal | No | Yes |

Figure 2:
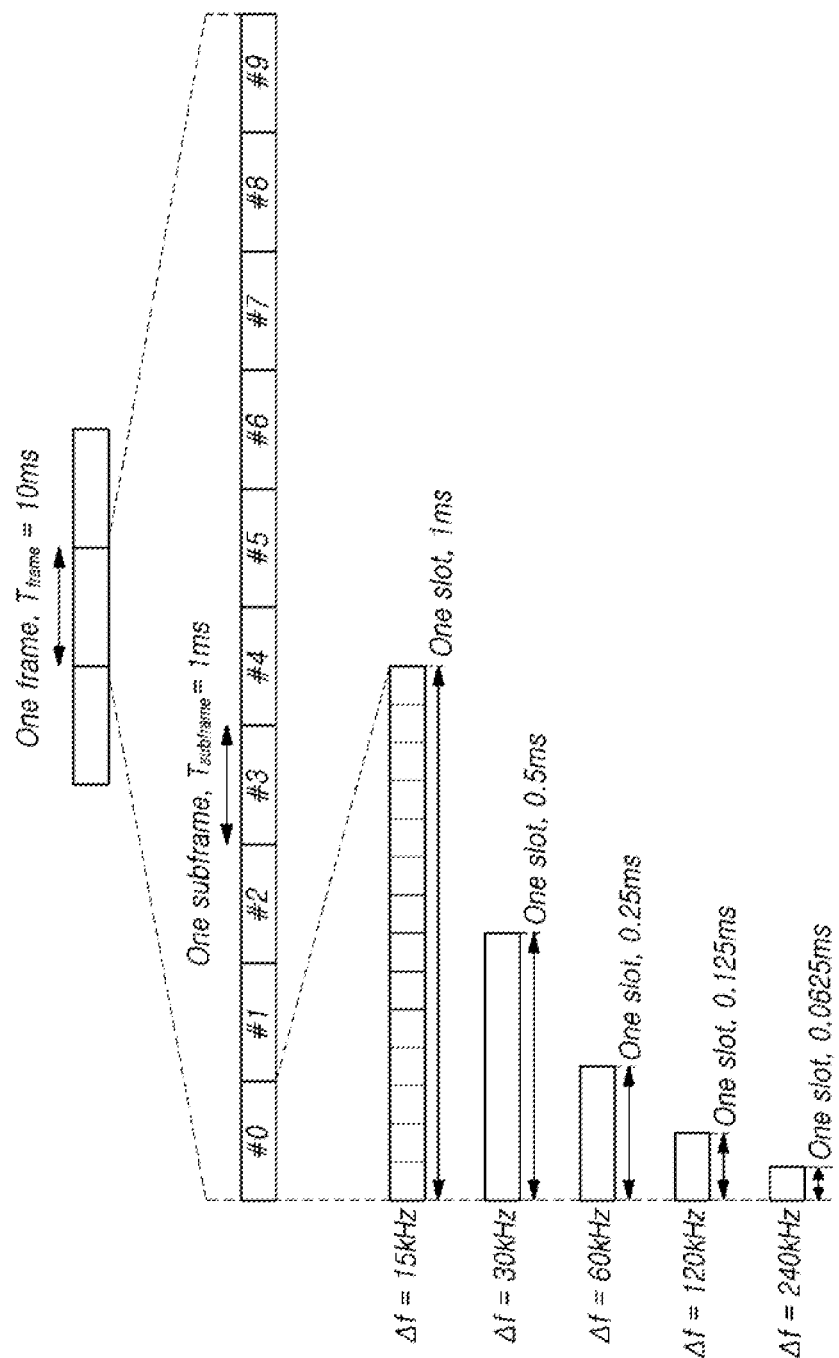
FIG. 2 is a view schematically illustrating a frame structure in an NR system in accordance with embodiments of the present disclosure.

As shown in Table 1 above, NR may have five types of numerologies according to subcarrier spacing. This is different from LTE, which is one of the 4G-communication technologies, in which the subcarrier spacing is fixed to 15 kHz. Specifically, in NR, subcarrier spacing used for data transmission is 15, 30, 60, or 120 kHz, and subcarrier spacing used for synchronization signal transmission is 15, 30, 120, or 240 kHz. In addition, an extended CP is applied only to the subcarrier spacing of 60 kHz. In NR frame structure, a frame is defined to include 10 sub-frames each having the same length of 1 ms and has a length of 10 ms. One frame may be divided into half frames of 5 ms, and each half frame includes 5 sub-frames. In the case of a subcarrier spacing of 15 kHz, one sub-frame includes one slot, and each slot includes 14 OFDM symbols. FIG. 2 is a view for explaining a frame structure in an NR system.

Referring to FIG. 2, a slot includes 14 OFDM symbols, which are fixed, in the case of a normal CP, but the length of the slot in the time domain may be varied depending on subcarrier spacing. For example, in the case of a numerology having a subcarrier spacing of 15 kHz, the slot is configured to have the same length of 1 ms as that of the sub-frame. On the other hand, in the case of a numerology having a subcarrier spacing of 30 kHz, the slot includes 14 OFDM symbols, but one sub-frame may include two slots each having a length of 0.5 ms. That is, the sub-frame and the frame may be defined using a fixed time length, and the slot may be defined as the number of symbols such that the time length thereof is varied depending on the subcarrier spacing.

NR defines a basic unit of scheduling as a slot and also introduces a minislot (or a subslot or a non-slot-based schedule) in order to reduce a transmission delay of a radio section. If wide subcarrier spacing is used, the length of one slot is shortened in inverse proportion thereto, thereby reducing a transmission delay in the radio section. A minislot (or subslot) is intended to efficiently support URLLC scenarios, and the minislot may be scheduled in 2, 4, or 7 symbol units.

In addition, unlike LTE, NR defines uplink and downlink resource allocation as a symbol level in one slot. In order to reduce a HARQ delay, the slot structure capable of directly transmitting HARQ ACK/NACK in a transmission slot has been defined. Such a slot structure is referred to as a "self-contained structure", which will be described.

NR was designed to support a total of 256 slot formats, and 62 slot formats thereof are used in 3GPP Rel-15. In addition, NR supports a common frame structure constituting an FDD or TDD frame through combinations of various slots. For example, NR supports i) a slot structure in which all symbols of a slot are configured for a downlink, ii) a slot structure in which all symbols are configured for an uplink, and iii) a slot structure in which downlink symbols and uplink symbols are mixed. In addition, NR supports data transmission that is scheduled to be distributed to one or more slots. Accordingly, the base station may inform the UE of whether the slot is a downlink slot, an uplink slot, or a flexible slot using a slot format indicator (SFI). The base station may inform a slot format by instructing, using the SFI, the index of a table configured through UE-specific RRC signaling. Further, the base station may dynamically instruct (e.g., inform or direct) the slot format through downlink control information (DCI) or may statically or quasi-statically instruct the same through RRC signaling.

<Physical Resources of NR>

With regard to physical resources in NR, antenna ports, resource grids, resource elements, resource blocks, bandwidth parts, and the like are taken into consideration.

The antenna port is defined to infer a channel carrying a symbol on an antenna port from the other channel carrying another symbol on the same antenna port. If large-scale properties of a channel carrying a symbol on an antenna port may be inferred from the other channel carrying a symbol on another antenna port, the two antenna ports may have a quasi-co-located or quasi-co-location (QC/QCL) relationship. The large-scale properties include at least one of delay spread, Doppler spread, a frequency shift, an average received power, and a received timing.

Figure 3:
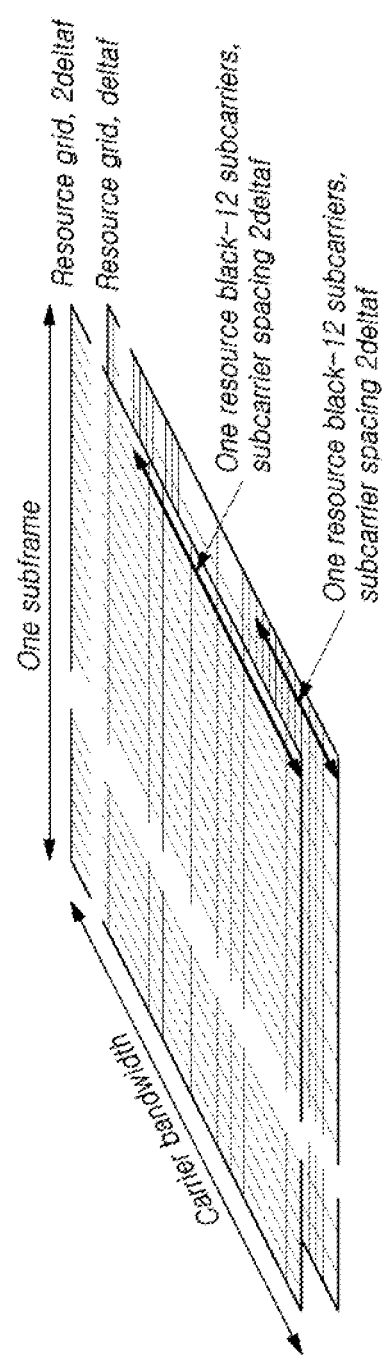
FIG. 3 is a view for explaining resource grids supported by a radio access technology in accordance with embodiments of the present disclosure.

FIG. 3 illustrates resource grids supported by a radio access technology in accordance with embodiments of the present disclosure.

Referring to FIG. 3, resource grids may exist according to respective numerologies because NR supports a plurality of numerologies in the same carrier. In addition, the resource grids may exist depending on antenna ports, subcarrier spacing, and transmission directions.

A resource block includes 12 subcarriers and is defined only in the frequency domain. In addition, a resource element includes one OFDM symbol and one subcarrier. Therefore, as shown in FIG. 3, the size of one resource block may be varied according to the subcarrier spacing. Further, "Point A" that acts as a common reference point for the resource block grids, a common resource block, and a virtual resource block are defined in NR.

Figure 4:
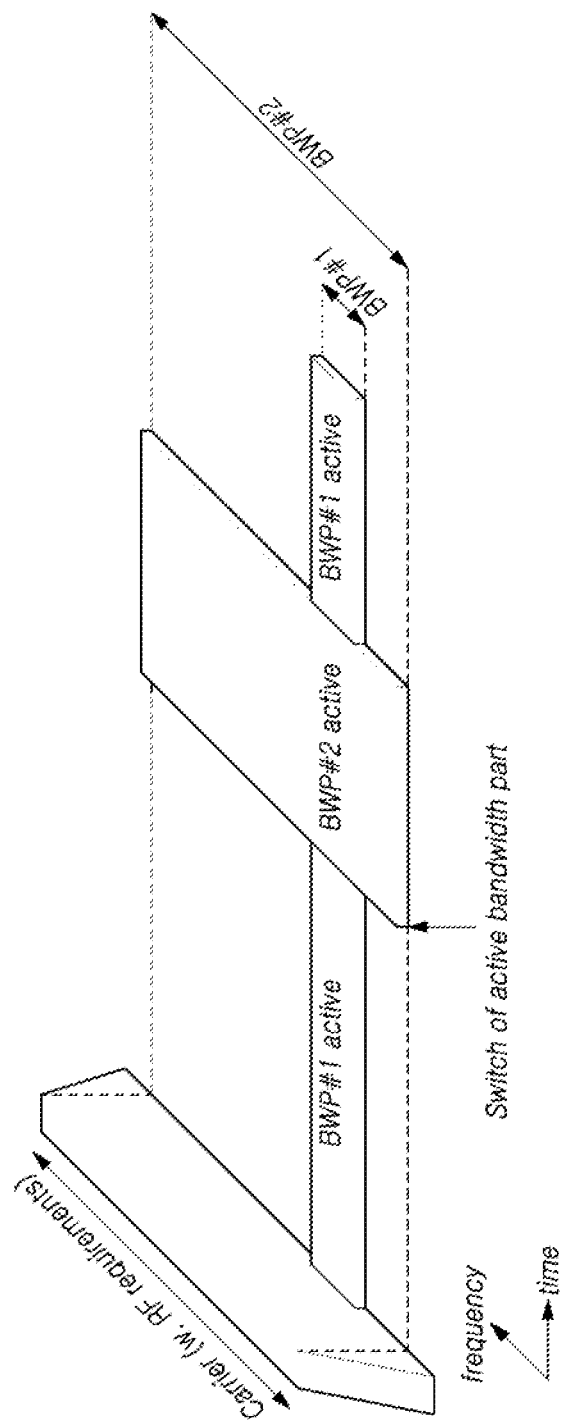
FIG. 4 is a view for explaining bandwidth parts supported by a radio access technology in accordance with embodiments of the present disclosure.

FIG. 4 illustrates bandwidth parts supported by a radio access technology in accordance with embodiments of the present disclosure.

Unlike LTE in which the carrier bandwidth is fixed to 20 MHz, the maximum carrier bandwidth is configured as 50 MHz to 400 MHz depending on the subcarrier spacing in NR. Therefore, it is not assumed that all UEs use the entire carrier bandwidth. Accordingly, as shown in FIG. 4, bandwidth parts (BWPs) may be specified within the carrier bandwidth in NR so that the UE may use the same. In addition, the bandwidth part may be associated with one numerology, may include a subset of consecutive common resource blocks, and may be activated dynamically over time. The UE has up to four bandwidth parts in each of the uplink and the downlink. The UE transmits and receives data using an activated bandwidth part during a given time.

In the case of a paired spectrum, uplink and downlink bandwidth parts are configured independently. In the case of an unpaired spectrum, in order to prevent unnecessary frequency re-tuning between a downlink operation and an uplink operation, the downlink bandwidth part and the uplink bandwidth part are configured in pairs to share a center frequency.

<Initial Access in NR>

In NR, a UE performs a cell search and a random access procedure in order to access and communicates with a base station.

The cell search is a procedure of the UE for synchronizing with a cell of a corresponding base station using a synchronization signal block (SSB) transmitted from the base station and acquiring a physical-layer cell ID and system information.

Figure 5:
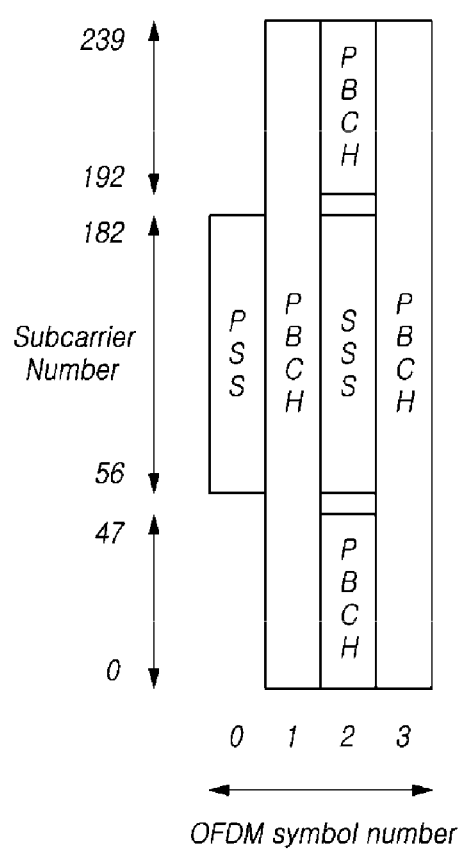
FIG. 5 is a view illustrating an example of a synchronization signal block in a radio access technology in accordance with embodiments of the present disclosure.

FIG. 5 illustrates an example of a synchronization signal block in a radio access technology in accordance with embodiments of the present disclosure.

Referring to FIG. 5, the SSB includes a primary synchronization signal (PSS) and a secondary synchronization signal (SSS), which occupy one symbol and 127 subcarriers, and PBCHs spanning three OFDM symbols and 240 subcarriers.

The UE monitors the SSB in the time and frequency domain, thereby receiving the SSB.

The SSB may be transmitted up to 64 times for 5 ms. A plurality of SSBs are transmitted by different transmission beams within a time of 5 ms, and the UE performs detection on the assumption that the SSB is transmitted every 20 ms based on a specific beam used for transmission. The number of beams that may be used for SSB transmission within 5 ms may be increased as the frequency band is increased. For example, up to 4 SSB beams may be transmitted at a frequency band of 3 GHz or less, and up to 8 SSB beams may be transmitted at a frequency band of 3 to 6 GHz. In addition, the SSBs may be transmitted using up to 64 different beams at a frequency band of 6 GHz or more.

One slot includes two SSBs, and a start symbol and the number of repetitions in the slot are determined according to subcarrier spacing as follows.

Unlike the SS in the typical LTE system, the SSB is not transmitted at the center frequency of a carrier bandwidth. That is, the SSB may also be transmitted at the frequency other than the center of the system band, and a plurality of SSBs may be transmitted in the frequency domain in the case of supporting a broadband operation. Accordingly, the UE monitors the SSB using a synchronization raster, which is a candidate frequency position for monitoring the SSB. A carrier raster and a synchronization raster, which are the center frequency position information of the channel for the initial access, were newly defined in NR, and the synchronization raster may support a fast SSB search of the UE because the frequency spacing thereof is configured to be wider than that of the carrier raster.

The UE may acquire an MIB over the PBCH of the SSB. The MIB (master information block) includes minimum information for the UE to receive remaining minimum system information (RMSI) broadcast by the network. In addition, the PBCH may include information on the position of the first DM-RS symbol in the time domain, information for the UE to monitor SIB1 (e.g., SIB1 numerology information, information related to SIB1 CORESET, search space information, PDCCH-related parameter information, etc.), offset information between the common resource block and the SSB (the position of an absolute SSB in the carrier is transmitted via SIB1), and the like. The SIB1 numerology information is also applied to some messages used in the random access procedure for the UE to access the base station after completing the cell search procedure. For example, the numerology information of SIB1 may be applied to at least one of the messages 1 to 4 for the random access procedure.

The above-mentioned RMSI may mean SIB1 (system information block 1), and SIB1 is broadcast periodically (e.g., 160 ms) in the cell. SIB1 includes information necessary for the UE to perform the initial random access procedure, and SIB1 is periodically transmitted over a PDSCH. In order to receive SIB1, the UE must receive numerology information used for the SIB1 transmission and the CORESET (control resource set) information used for scheduling of SIB1 over a PBCH. The UE identifies scheduling information for SIB1 using SI-RNTI in the CORESET. The UE acquires SIB1 on the PDSCH according to scheduling information. The remaining SIBs other than SIB1 may be periodically transmitted, or the remaining SIBs may be transmitted according to the request of the UE.

Figure 6:
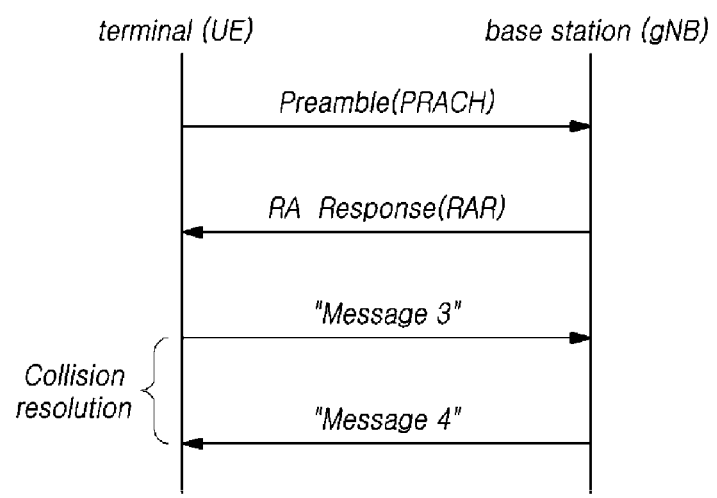
FIG. 6 is a signal diagram for explaining a random access procedure in a radio access technology in accordance with embodiments of the present disclosure.

FIG. 6 is a view for explaining a random access procedure in a radio access technology.

Referring to FIG. 6, if a cell search is completed, the UE transmits a random access preamble for random access to the base station. The random access preamble is transmitted over a PRACH. Specifically, the random access preamble is periodically transmitted to the base station over the PRACH that includes consecutive radio resources in a specific slot repeated. In general, a contention-based random access procedure is performed when the UE makes initial access to a cell, and a non-contention-based random access procedure is performed when the UE performs random access for beam failure recovery (BFR).

The UE receives a random access response to the transmitted random access preamble. The random access response may include a random access preamble identifier (ID), UL Grant (uplink radio resource), a temporary C-RNTI (temporary cell-radio network temporary identifier), and a TAC (time alignment command). Since one random access response may include random access response information for one or more UEs, the random access preamble identifier may be included in order to indicate the UE for which the included UL Grant, temporary C-RNTI, and TAC are valid. The random access preamble identifier may be an identifier of the random access preamble received by the base station. The TAC may be included as information for the UE to adjust uplink synchronization. The random access response may be indicated by a random access identifier on the PDCCH (e.g., a random access-radio network temporary identifier: RA-RNTI).

Upon receiving a valid random access response, the UE processes information included in the random access response and performs scheduled transmission to the base station. For example, the UE applies the TAC and stores the temporary C-RNTI. In addition, the UE transmits, to the base station, data stored in the buffer of the UE or newly generated data using the UL Grant. In this case, information for identifying the UE must be included in the data.

Lastly, the UE receives a downlink message to resolve the contention.

<NR Coreset>

The downlink control channel in NR is transmitted in a CORESET (control resource set) having a length of 1 to 3 symbols, and the downlink control channel transmits uplink/downlink scheduling information, an SFI (slot format index), TPC (transmit power control) information, and the like.

As described above, NR has introduced the concept of CORESET in order to secure the flexibility of a system. The CORESET (control resource set) refers to a time-frequency resource for a downlink control signal. The UE may decode a control channel candidate using one or more search spaces in the CORESET time-frequency resource. CORESET-specific QCL (quasi-colocation) assumption is configured and is used for the purpose of providing information on the characteristics of analogue beam directions, as well as delay spread, Doppler spread, Doppler shift, and an average delay, which are the characteristics assumed by existing QCL.

Figure 7:
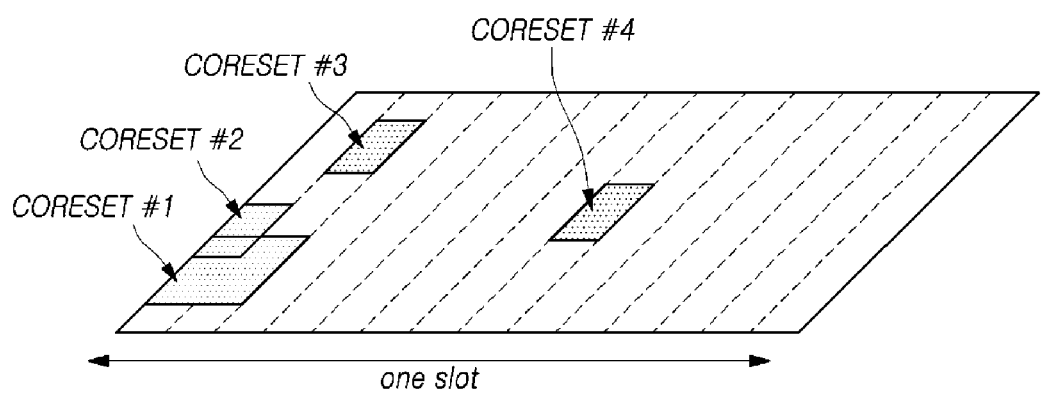
FIG. 7 is a view for explaining CORESET.

FIG. 7 illustrates CORESET.

Referring to FIG. 7, CORESETs may exist in various forms within a carrier bandwidth in a single slot, and the CORESET may include a maximum of 3 OFDM symbols in the time domain. In addition, the CORESET is defined as a multiple of six resource blocks up to the carrier bandwidth in the frequency domain.

A first CORESET, as a portion of the initial bandwidth part, is designated (e.g., instructed, assigned) through an MIB in order to receive additional configuration information and system information from a network. After establishing a connection with the base station, the UE may receive and configure one or more pieces of CORESET information through RRC signaling.

In this specification, a frequency, a frame, a subframe, a resource, a resource block, a region, a band, a subband, a control channel, a data channel, a synchronization signal, various reference signals, various signals, or various messages in relation to NR (New Radio) may be interpreted as meanings used at present or in the past or as various meanings to be used in the future.

<NR Sidelink>

NR is required to be designed not only to provide an improved data transmission rate but also to meet various QoS requirements for each detailed and specific usage scenario, compared to the LTE/LTE-Advanced. In particular, an enhanced mobile broadband (eMBB), massive machine-type communication (mMTC), and ultra reliable and low latency communication (URLLC) are defined as representative usage scenarios of NR. In order to meet requirements for each usage scenario, it is required to design NR to have a more flexible frame structure as compared to the LTE/LTE-Advanced.

Since each usage scenario imposes different requirements for data rates, latency, coverage, etc., there arises a need for a method of efficiently multiplexing numerology-based (e.g., a subcarrier spacing (SCS), a subframe, a transmission time interval (TTI), etc.) radio resource units different from each other, as a solution for efficiently satisfying requirements according to usage scenarios over a frequency band provided to an NR system.

To this end, there have been discussions on i) methods of multiplexing numerologies having subcarrier spacing (SCS) values different from one another based on TDM, FDM or TDM/FDM over one NR carrier, and ii) methods of supporting one or more time units in configuring a scheduling unit in the time domain. In this regard, in NR, a definition of a subframe has been given as one type of a time domain structure. In addition, as a reference numerology to define a corresponding subframe duration, a single subframe duration is defined as having 14 OFDM symbols of normal CP overhead based on 15 kHz subcarrier spacing (SCS), like the LTE. Therefore, the subframe of NR has the time duration of 1 ms.

Unlike LTE, since the subframe of NR is an absolute reference time duration, a slot and a mini-slot may be defined as a time unit for actual UL/DL data scheduling. In this case, the number of OFDM symbols which constitutes a slot, a value of y, has been defined as y=14 regardless of the numerology.

Therefore, a slot may be made up of 14 symbols. In accordance with a transmission direction for a corresponding slot, all symbols may be used for DL transmission or UL transmission, or the symbols may be used in the configuration of a DL portion+a gap+a UL portion.

Further, a mini-slot has been defined to be made up of fewer symbols than the slot in a numerology (or SCS), and as a result, a short time domain scheduling interval may be configured for UL/DL data transmission or reception based on the mini-slot. Also, a long time domain scheduling interval may be configured for the UL/DL data transmission or reception by slot aggregation.

Particularly, in the case of the transmission or reception of latency critical data, such as the URLLC, when scheduling is performed on a slot basis based on 1 ms (14 symbols) defined in a frame structure based on a numerology having a small SCS value, for example, 15 kHz, latency requirements may be difficult to be satisfied. To this end, a mini-slot made up of fewer OFDM symbols than the slot may be defined, and thus the scheduling for the latency critical data, such as the URLLC, may be performed based on the mini-slot.

Figure 8:
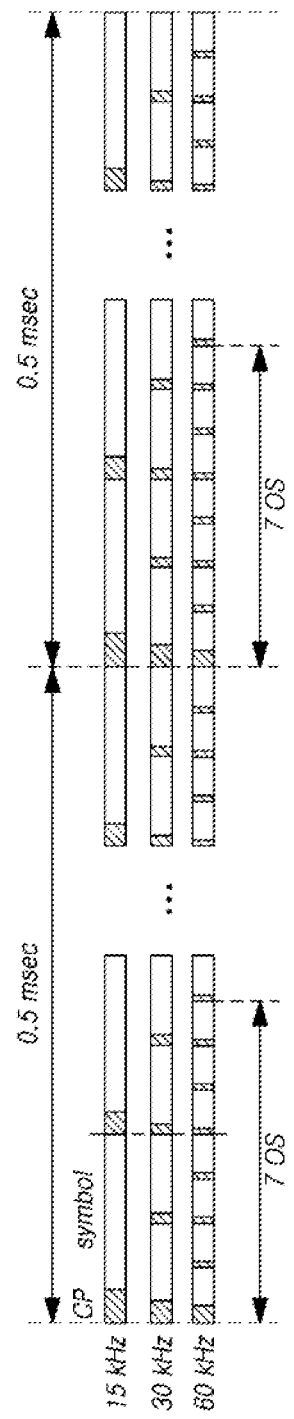
FIG. 8 is a view illustrating an example of symbol level alignment among different subcarrier spacings (SCSs) in accordance with embodiments of the present disclosure.

As described above, it is also contemplated to schedule the data according to the latency requirement based on the length of the slot (or minislot) defined by the numerology by supporting the numerology with the different SCS values in one NR carrier by multiplexing them in the TDM and/or FDM manner. For example, as shown in FIG. 8, when the SCS is 60 kHz, the symbol length is reduced to about ¼ of that of the SCS 15 kHz. Therefore, when one slot is made up of 14 OFDM symbols, the slot length based on 15 kHz is 1 ms whereas the slot length based on 60 kHz is reduced to about 0.25 ms.

Thus, since different SCSs or different TTI lengths from one another are defined in NR, technologies have been developed for satisfying requirements of each of URLLC and eMBB.

Physical Resources

A physical resource for NR may be configured to be flexible compared to LTE. A common resource block (CRB) is defined from a point A which is a reference point of a frequency radio resource unit of a NR cell. A BWP configuration for transmission/reception of a UE is made based on the CRB. In addition, when a plurality of SCSs are supported in a cell, a configuration for each subcarrier spacing-specific carrier bandwidth may also be made. In addition, the PRB and the VRB are units of radio resource allocation for a UE, and the PRB and the VRB are configured for each BWP configured for the UE.

<Bandwidth Part; BWP>

The typical LTE system supports scalable bandwidth operations for LTE CC (component carrier). That is, according to a frequency deployment scenario, an LTE provider may configure a bandwidth of a minimum of 1.4 MHz to a maximum of 20 MHz in configuring a single LTE CC, and a normal LTE UE supports a transmission/reception capability of a bandwidth of 20 MHz for a single LTE CC.

Figure 9:
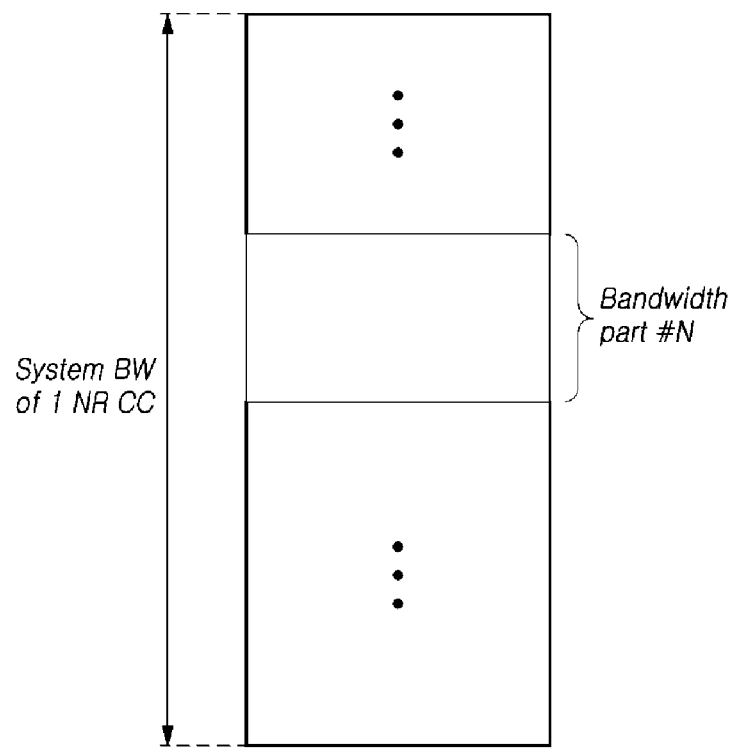
FIG. 9 is a view schematically illustrating a bandwidth part.

However, NR is designed to support the NR UE having different transmission/reception bandwidth capabilities over a single wideband NR CC. Accordingly, it is required to configure one or more bandwidth parts (BWPs) including subdivided bandwidths for an NR CC as shown FIG. 9, thereby supporting a flexible and wider bandwidth operation through configuration and activation of different bandwidth parts for respective UEs.

Specifically, one or more bandwidth parts may be configured through a single serving cell configured for a UE in NR, and the UE is defined to activate one downlink (DL) bandwidth part and one uplink (UL) bandwidth part to use the same for uplink/downlink data transmission/reception in the corresponding serving cell. In addition, in the case where a plurality of serving cells is configured for the UE (i.e., the UE to which CA is applied), the UE is also defined to activate one downlink bandwidth part and/or one uplink bandwidth part in each serving cell to use the same for uplink/downlink data transmission/reception by utilizing radio resources of the corresponding serving cell.

Specifically, an initial bandwidth part for an initial access procedure of a UE may be defined in a serving cell; one or more UE-specific bandwidth parts may be configured for each UE through dedicated RRC signaling, and a default bandwidth part for a fallback operation may be defined for each UE.

It is possible to define simultaneously activating and using a plurality of downlink and/or uplink bandwidth parts according to the capability of the UE and the configuration of the bandwidth parts in a serving cell. However, NR rel-15 defined activating and using only one downlink (DL) bandwidth part and one uplink (UL) bandwidth part at a time.

The bandwidth part (BWP) may be composed of continuous resource blocks (RBs) on the frequency axis. One BWP may correspond to one numerology (e.g., sub-carrier spacing, CP length, slot/mini-slot duration, etc.).

On the other hand, the base station may configure a plurality of BWPs in one component carrier (CC) configured in the UE. The base station may configure at least one DL/UL BWP to the UE associated with the broadband CC, and at least one DL/UL BWP among the DL/UL BWP(s) configured at a specific time may be activated through the physical layer signaling such as the DCI, etc., the MAC signaling, the RRC signaling, etc. In this case, the activated DL/UL BWP may be referred to as an active DL/UL BWP. The UE may not receive the configuration for the DL/UL BWP from the base station before the initial access procedure or the RRC connection is configured up. A DL/UL BWP for such a UE may be referred to as an initial active DL/UL BWP.

More specifically, the UE according to various embodiments of the present disclosure may perform the following bandwidth part operation.

When the UE may be configured to operate in the bandwidth parts of the serving cell, up to four DL BWPs in the DL bandwidth on the serving cell are configured for the UE by a higher layer parameter (e.g., DL-BWP or BWP-Downlink), and up to four of 4 UL BWPs in the UL bandwidth on the serving cell are configured for the UE by a higher layer parameter (e.g., UL-BWP or BWP-Uplink).

When the UE does not receive the higher layer parameter initialDownlinkBWP, the initial active DL BWP may be defined by the position and the number of consecutive PRBs from the smallest index to the largest index among the PRBs included in the CORESET (control resource set) for the Type-0 PDCCH CSS (Common Search Space) set. In addition, the initial active DL BWP may be defined by the subcarrier spacing (SCS) and the cyclic prefix for PDCCH reception in the CORESET for the Type-0 PDCCH CSS set. Alternatively, the initial active DL BWP may be provided by the higher layer parameter initialDownlinkBWP. For operation in a primary cell or a secondary cell, the UE may be provided with an initial active UL BWP by a higher layer parameter initialuplinkBWP. If a supplementary UL carrier is configured for the UE, the UE may be provided with the initial active UL BWP on the supplementary UL carrier by initialUplinkBWP in the higher layer parameter supplementary Uplink.

In 3GPP NR, it is designed to operate under the assumption that all UEs basically support 100 MHz in FR1 and 400 MHz in FR2. However, in the reduced capability environment for UEs that require only performance lower than the NR basic performance such as IoT, communication between the UE and the base station will be performed using only a limited frequency band or bandwidth.

In this case, a procedure for distinguishing and accessing these UEs is not provided in the initial access procedure, unlike data communication that may configure a band suitable for each UE by separately configuring a bandwidth part (BWP) and a UE-specific search space (USS). Accordingly, with respect to the 3GPP NR-RedCap SI currently under discussion, the maximum UE bandwidth in the initial access may be at least 20 MHz for FR1, the maximum UE bandwidth in the initial access may be 50 MHz and 100 MHz for FR2, and other bandwidths will be discussed later.

The system band required for each procedure of the initial access in the 3GPP NR has the following properties.

1) A synchronization signal block (SSB) transmitting a synchronization signal and initial system information has a frequency width of 20 RB (resource block). The SSB has a band of approximately 7.5 MHz when the subcarrier frequency is 30 kHz, which is the maximum value supported by FR1. In addition, the SSB has a band of approximately 60 MHz when the subcarrier frequency is 240 kHz, which is the maximum value supported by FR2.

2) The initial system information specifies, in the MIB (Master Information Block) within the SSB, an initial BWP-related information for a transmission period of the PDSCH carrying SIB1 (System Information Block 1) and information on how the CORESET in which the PDCCH indicating a corresponding PDSCH exists and the SSB is multiplexed. In the case of FR1, CORESET RB such as 96RB is supported at a maximum offset of 56RB at PDSCH with the SCS of 15 kHz and CORESET RB such as 48RB is supported at a maximum offset of 28RB at PDSCH with the SCS of 30 kHz. They each also require a band of about 30 MHz for operation. In case of FR2, CORESET RB such as 96RB is supported at a maximum offset of 97RB at PDSCH with the SCS of 60 kHz, and CORESET RB such as 48 RB is supported ah a maximum offset of 49 RB at PDSCH with the SCS of 120 kHz. They each have a band about 140 MHz for operation.

3) The UE attempts an initial access through the PRACH and the PUSCH resources configured by rach-ConfigCommon in the BWP-UplinkCommon message in the UplinkConfigCommonSlB message in the ServingCellConfigCommonSIB message included in SIB1. At this time, the PRACH and the PUSCH follow the location in the initial BWP configured in UplinkConfigCommonSlB.

Accordingly, the UE fully receives the SSB already provided before transmitting any information about itself, receives the SIB1 according to the configuration about the initial DL BWP, and configures the initial UL BWP according to the SIB1.

In the 3GPP NR system, since it was assumed that the performance of each UE was the same, the initial DL/UL BWP was configured without information about the UE. From the standpoint of the base station, it was possible to arbitrarily configure the initial BWP band within 100 MHz in FR1 and 400 MHz in FR2, which is the mandatory support range of the UE. It is possible to configure each initial BWP to have a smaller band by considering the case where a UE supporting only a smaller band is accessing in advance, but it is inefficient for all UEs to configure each initial BWP in such a way in terms of resource utilization. In the case of arbitrarily configuring each initial BWP different from each other, a UE that may not support the corresponding band may have to perform synchronization signal reception and SIB analysis several times until it finds the related configuration within the supported range.

Reduced Capability NR Devices

In the case of Rel-15/16 NR devices, a high-end device-based system design was made for the purpose of maximizing the performance of the initial NR system. That is, in order to maximize the data transmission speed of the NR system, the radio transmission duration was designed based on a high complexity NR device. In the case Rel-17 NR, a radio transmission duration design to support a low-end NR device having a lower complexity compared to the high-end NR device described above will be made. The corresponding low-end device, that is, a reduced complexity NR device, may assume the following UE complexity reduction.

Reduced number of UE receive/transmit antennas (RX/TX antennas)

UE bandwidth reduction

Rel-15 SSB bandwidth is reused, L1 changes should be minimized

Half-Duplex-FDD

Relaxed UE processing time

Relaxed UE processing capability

In the present disclosure, it may be understood that 'Reduced capability NR devices' may be described as a low-power UE, a UE with limited bandwidth, etc., and be referred to as a UE with reduced performance than a UE generally assumed in the NR.

The present disclosure provides a method of the low-power UE for successfully performing the initial access with a low operating band in NR. In particular, the present disclosure provides a method of discovering the synchronization signal in advance providing system information that the UE may not receive, a method of transmitting a configuration message in advance so that the low-power UE may receive it, and a method of separately configuring a configuration space to be used.

Hereinafter, a method of a user equipment for performing the initial access will be specifically described with reference to the accompanying drawings.

Figure 10:
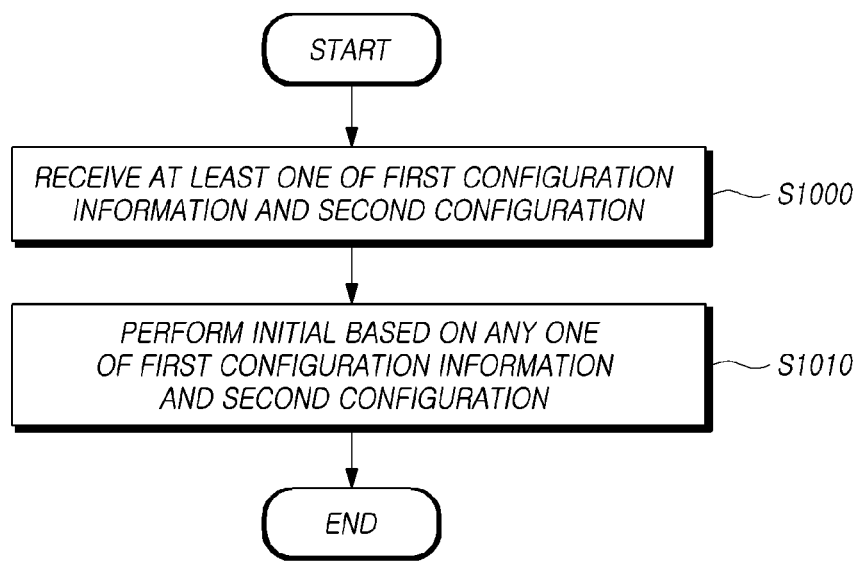
FIG. 10 is a flowchart of a method of a user equipment for performing an initial access according to an embodiment.

FIG. 10 is a flowchart showing a method of a user equipment for performing an initial access in a limited bandwidth according to an embodiment.

Referring to FIG. 10, the UE may receive at least one of first configuration information which is configured for a UE having a limited bandwidth in which an available bandwidth is narrower than a predetermined bandwidth and second configuration information which is configured for a UE having the predetermined bandwidth at S1000.

In NR, the initial access refers to a process of initially searching for a cell or a process in which a UE in an idle/inactive state accesses the network when the UE enters the coverage of the system. In general, the initial access may be referred to as an access random.

In the initial access process, the UE receives the PSS and the SSS, which are synchronization signals transmitted in downlink from each cell in order to search for the cell. The PSS/SSS is received as a synchronization signal block (SSB) together with a physical broadcast channel (PBCH). The UE receives the MIB providing information on the PDCCH-related parameters necessary for monitoring the SIB1 through the PBCH.

The UE receives the SIB1 transmitted through the PDSCH based on the information in the MIB. The SIB1 is generally provided through the PDSCH scheduled at a period of 160 ms, and includes information necessary for the UE to perform initial access and scheduling related information on other system information.

The pdcch-ConfigSIB1 message in the MIB is used to configure CORESET #0 and search space #0, and an initial downlink bandwidth part may be defined and activated based on the values of CORESET #0 and search space #0.

In addition, the configuration of the initial uplink bandwidth part may be made through the SIB1 scheduled using the PDCCH.

In this way, the UE may obtain the configurations for downlink and uplink for the initial access by at least one of the MIB and the SIB1. The above description of MIB and SIB1 relates to the MIB and the SIB1 for the UE generally assumed in the NR system, and in the following, the second configuration information may be used to mean the corresponding MIB and SIB1.

As an example, it is assumed that a UE performing the initial access to a cell is a UE having a limited bandwidth, in which an available bandwidth is narrower than a predetermined bandwidth. In this case, the MIB and the SIB1 in separate formats for the above-described initial access may be configured for the UE having the corresponding limited bandwidth. That is, the first configuration information may be used to mean the MIB and the SIB1 separately configured for a UE having the limited bandwidth and/or other system information.

The first configuration information comprises configuration information on at least one of an initial downlink bandwidth part (initial DL BWP) and an initial uplink bandwidth part (initial UL BWP) that are separately configured for the UE having the limited bandwidth. That is, the MIB and the SIB1 and/or the other system information included in the first configuration information may be defined to configure the initial downlink bandwidth part and the initial uplink bandwidth part for the UE having the limited bandwidth, separately from the existing general UE. The existing general UE may be a typical UE having the predetermined bandwidth.

In this case, at least one of the initial downlink bandwidth part and the initial uplink bandwidth part separately configured for the UE having the limited bandwidth are configured to have a bandwidth equal to or smaller than the limited bandwidth.

Also, the first configuration information may further include information related to a random access operation performed in the initial access process. That is, the information related to the random access operation may also be separately configured for the UE having the limited bandwidth.

As an example, the initial uplink bandwidth part separately configured for the UE having the limited bandwidth includes at least one random access channel occasions or RACH occasions separately configured for the UE having the limited bandwidth. Preamble transmission may occur within a slot configured as a RACH slot for every RACH configuration period. There may be K RACH occasions within this RACH slot. In this regard, for the UE having the limited bandwidth, the RACH occasions may be configured based on the bandwidth of the initial uplink bandwidth part configured in the corresponding UE.

The first configuration information includes information on a random access channel resource configured based on a sequence which is separately configured for the UE having the limited bandwidth. That is, the random access channel resource may be configured for the UE having the limited bandwidth by applying a separate sequence. That is, the sequence applied to generate a random access preamble may be applied as a sequence different from that of the general UE assumed in the NR system.

According to an embodiment, the first configuration information may be configured to be received not only by the UE having the limited bandwidth but also by the general UE assumed in the NR system. According to another embodiment, the first configuration information may be configured to be received only by the UE having the limited bandwidth. In addition, the second configuration information may be configured not to be received by the UE having the limited bandwidth.

Referring back to FIG. 10, the UE may perform an initial access based on any one of the first configuration information and the second configuration information at S1010.

According to an embodiment, the first configuration information and the second configuration information may be defined separately from each other. According to another embodiment, it may be defined that a configuration information corresponding to the first configuration information is selected according to a value of an arbitrary field in the second configuration information. According to still another embodiment, in the second configuration information, a configuration information corresponding to the first configuration information may be defined to be separately added.

In the case of the general UE assumed in the NR system, the UE may perform the initial access procedure based on the second configuration information.

In the case of the UE having the limited bandwidth, the UE may perform the initial access procedure based on the first configuration information. That is, the UE having the limited bandwidth may perform the initial access according to the configuration information corresponding to the first configuration information.

Also, the UE having the limited bandwidth may generate the random access preamble by applying a separate sequence or transmit it through at least one separately configured random access channel occasion. In this case, the base station may determine that the corresponding UE is the UE having the limited bandwidth without additional information, and then perform the random access operation.

The method of the UE for performing the initial access according to an embodiment may perform the initial access in the limited bandwidth with respect to the UE having the limited bandwidth in which the available bandwidth is narrower than the predetermined bandwidth in the NR system.

Hereinafter, the operation of the base station related to the operation of the above-described UE will be described with reference to the drawings.

Figure 11:
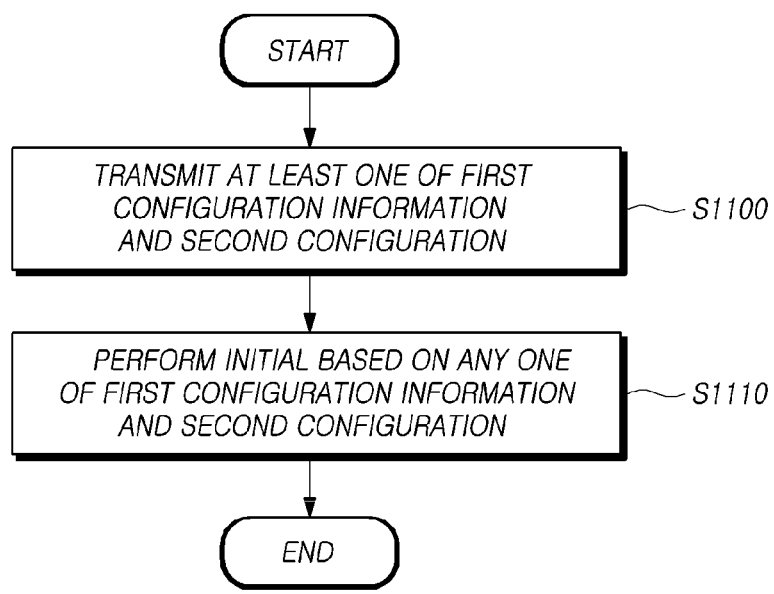
FIG. 11 is a flowchart of a method of a base station for performing an initial access according to an embodiment.

FIG. 11 is a flowchart of a method of a base station for performing an initial access in a limited bandwidth according to an embodiment.

Referring to FIG. 11, the base station may transmit at least one of i) first configuration information which is configured for a UE having a limited bandwidth in which an available bandwidth is narrower than a predetermined bandwidth and ii) second configuration information which is configured for a typical UE having the predetermined bandwidth at S1100.

In the initial access process, the base station transmits the PSS and the SSS, which are synchronization signals so that the UE may search for the cell. The PSS/SSS is received as a synchronization signal block (SSB) together with a physical broadcast channel (PBCH). The base station transmits the MIB providing information on the PDCCH-related parameters necessary for monitoring the SIB1 through the PBCH.

The base station transmits the SIB1 transmitted through the PDSCH based on the information in the MIB. The SIB1 is generally provided through the PDSCH scheduled at a period of 160 ms, and the SIB1 includes information necessary for the UE to perform the initial access and scheduling related information on other system information.

The pdcch-ConfigSIB1 message in the MIB is used to configure CORESET #0 and search space #0, and an initial downlink bandwidth part may be defined and activated based on the values of CORESET #0 and search space #0. In addition, the configuration of the initial uplink bandwidth part may be made through the SIB1 scheduled using the PDCCH.

In this way, the base station may transmit the configurations for downlink and uplink for the initial access by at least one of the MIB and the SIB1. The above description of MIB and SIB1 relates to the MIB and the SIB1 for the typical UE generally assumed in the NR system, and in the following, the second configuration information may be used to mean the corresponding MIB and SIB1.

According to an embodiment, it is assumed that a UE performing the initial access to a cell is a UE having a limited bandwidth, in which an available bandwidth is narrower than a predetermined bandwidth. In this case, the MIB and the SIB1 in separate formats for the above-described initial access may be configured for the UE having the corresponding limited bandwidth. That is, the first configuration information may be used to mean the MIB and the SIB1 separately configured for a UE having the limited bandwidth and/or other system information.

The first configuration information includes configuration information on at least one of an initial downlink bandwidth part (initial DL BWP) and an initial uplink bandwidth part (initial UL BWP) that are separately configured for the UE having the limited bandwidth. That is, the MIB and the SIB1 and/or the other system information included in the first configuration information may be defined to configure the initial downlink bandwidth part and the initial uplink bandwidth for the UE having the limited bandwidth, separately from the existing general UE. The existing general UE may be a typical UE having the predetermined bandwidth.

In this case, at least one of the initial downlink bandwidth part and the initial uplink bandwidth part separately configured for the UE having the limited bandwidth are configured to have a bandwidth equal to or smaller than the limited bandwidth.

Also, the first configuration information may further include information related to a random access operation performed in the initial access process. That is, the information related to the random access operation may also be separately configured for the UE having the limited bandwidth.

According to an embodiment, the initial uplink bandwidth part separately configured for the UE having the limited bandwidth includes at least one random access channel occasions or RACH occasions separately configured for the UE having the limited bandwidth. Preamble transmission may occur within a slot configured as a RACH slot for every RACH configuration period. There may be K RACH occasions within this RACH slot. In this regard, for the UE having the limited bandwidth, the RACH occasions may be configured based on the bandwidth of the initial uplink bandwidth part configured in the corresponding UE.

The first configuration information includes information on a random access channel resource configured based on a sequence which is separately configured for the UE having the limited bandwidth. That is, the random access channel resource may be configured for the UE having the limited bandwidth by applying a separate sequence. That is, the sequence applied to generate a random access preamble may be applied as a sequence different from that of the general UE assumed in the NR system.

According to an embodiment, the first configuration information may be configured to be received not only by the UE having the limited bandwidth but also by the general UE assumed in the NR system. Alternatively, the first configuration information may be configured to be received only by the UE having the limited bandwidth. In addition, the second configuration information may be configured not to be received by the UE having the limited bandwidth.

Referring back to FIG. 11, the base station may perform an initial access based on any one of the first configuration information and the second configuration information at S1120.

According to an embodiment, the first configuration information and the second configuration information may be defined separately from each other. According to another embodiment, it may be defined that a configuration information corresponding to the first configuration information is selected according to a value of a field in the second configuration information. According to still another embodiment, in the second configuration information, a configuration information corresponding to the first configuration information may be defined to be separately added.

In the case of the general UE assumed in the NR system, the base station may perform the initial access procedure based on the second configuration information.

In the case of the UE having the limited bandwidth, the UE may perform the initial access procedure based on the first configuration information. That is, the UE having the limited bandwidth may perform the initial access according to the configuration information corresponding to the first configuration information.

Also, the UE having the limited bandwidth may generate the random access preamble by applying a separate sequence or transmit it through at least one separately configured random access channel occasion. In this case, the base station may determine that the corresponding UE is the UE having the limited bandwidth without additional information, and then perform the random access operation.

The method of the base station for performing the initial access according to an embodiment may perform the initial access in the limited bandwidth with respect to the UE having the limited bandwidth in which the available bandwidth is narrower than the predetermined bandwidth in the NR system.

Hereinafter, each embodiment related to a method of performing the initial access in the limited bandwidth in the NR system will be described in detail with reference to related drawings. The embodiments described below may be applied individually or in any combination.

As mentioned above, the present disclosure provides a method of the low-power UE for successfully performing the initial access with a low operating band in NR. In particular, the present disclosure provides a method of discovering the synchronization signal in advance providing system information that the UE may not receive, a method of transmitting a configuration message in advance so that the low-power UE may receive it, and a method of separately configuring a configuration space to be used.

Specifically, the present disclosure relates to (1) a synchronization signal operation method for the low-power UE, (2) an initial downlink configuration method for the low-power UE, (3) an initial uplink configuration method for the low-power UE, and (4) a random access method to inform that a UE is the low-power UE at the time of the initial access.

Embodiment 1. Synchronization Signal Operation Method for Power UE

The embodiment 1 is a method for operating a synchronization signal that the low-power UE may access. This allows the low-power UE to receive only the SSB that will provide it with a valid initial access establishment. Specifically, the embodiment 1 may be divided into the PSS/SSS sequence configuration method for the low-power UE, a new Global Synchronization Channel Number (GSCN) configuration method, an introduction method of the SSB of a new structure, a DMRS arrangement change method, and an environment restriction method.

① PSS/SSS Sequence Configuration for Low-Power UE

For the low-power UE, a restriction on the signal of the PSS/SSS of the SSB accessed by the corresponding UE may be configured. In particular, the typically used PSS signal uses a Zadoff-Chu sequence of length 127, and the typically used SSS signal uses a Gold sequence of the same length. Some of the typically used sequence determination parameters or typically unused parameters may be introduced. Some of these typically used sequence determination parameters or typically unused parameters may be configured as synchronization signal parameters for the low-power UEs. The low-power UE may reduce cell search complexity by searching only the signal of the corresponding parameter.

② New GSCN Configuration

For the low-power UE, a restriction on a frequency domain in which the corresponding UE searches for the synchronization signal may be configured. To this end, there is a limit to the number of GSCN typically used may be configured, or a typically unused frequency domain may be specified. For example, GSCN numbers are arranged at intervals of approximately 1.44 MHz in FR1 and 17.28 MHz in FR2, and the interval value of each GSCN parameter may be configured to a frequency position at which the synchronization signal for the low-power UE is transmitted.

③ Introduction of SSB of a New Structure

For the low-power UE, a new type of SSB to be received by the UE may be introduced. In the existing SSB, PSS, PBCH, SSS, and PBCH are arranged using 4 symbols within 20RB, and the PBCH is arranged in 8 RBs above and below the symbol where the PSS and the SSS are located. This type is used as an SSB for the UE. For this, an SSB having a completely different structure may be introduced for the low-power UE, or an SSB having the same/similar type as the S-SSB, which is a sidelink synchronization signal, may be used. In this case, erroneous synchronization may be avoided by using the PSS/SSS sequence different from that used in the sidelink.

④ DMRS Arrangement Change

For the low-power UE, a type of a DMRS sequence included in the PBCH to be received by the UE may be configured differently, or a location of the DMRS may be configured to be different from its location used previously. To this end, the type of the DMRS sequence of the PBCH for the low-power UE may be limited or the DMRS sequence of the PBCH not previously used may be used. In addition, the DMRS included in the PBCH, which are typically disposed one by one at an interval of 4RE, may be located in a different pattern by changing the interval of RE, transmitting only a specific symbol/position, transmitting some REs with zero power, and the like.

⑤ Environmental Restrictions

For the low-power UE, a restriction on a parameter of the synchronization signal block to be received by the corresponding UE may be configured. In this regard, the type of the PSS/SSS sequence of the SSB for the low-power UE may be limited. Alternatively, the location of the slot/SFN in which the corresponding SSB exists may be limited, or the Cell ID may be restricted.

Embodiment 2. Initial Downlink Configuration Method for Low-Power UE

The embodiment 2 is a method of configuring an initial downlink transmission in the synchronization signal intended to be received by the low-power UE. In particular, in the case of the n79 band, it is assumed that the minimum value of the frequency band is 40 MHz, and the configuration of the initial downlink BWP for the low-power UE in the corresponding environment may be made in a format different from the existing ones. For band restriction, the embodiment 2 may include a method of limiting the configuration range of pdcch-ConfigSIB1 and a method of introducing a new table.

① Limit the Configuration Range of pdcch-ConfigSIB1

For the low-power UE, a value configured by pdcch-ConfigSIB1 may be limited. The message consists of a 4-bit CORESET configuration value and a 4-bit Search Space configuration value, which are mapped to index values of various tables. At this time, with respect to the synchronization signal for the low-power UE, the PDCCH BWP configuration value due to this value may be configured to be limited to a specific range that does not exceed the use range of the UE. For example, when it is identified as the synchronization signal for the low-power UE through the above-described embodiment 1, when the SCS of the PDCCH is 15 kHz, the CORESET length may not configure a value of 96.

② Introduce a New Table

For the low-power UE, a table defining CORESET #0 and Search Space #0 for the low-power UE may be newly defined. When the synchronization signal for the low-power UE is identified through the above-described embodiment 1, a corresponding table may be configured using a table newly defined for a low-power UE.

Embodiment 3. Initial Uplink Configuring Method for Low-Power UE

The embodiment 3 is a method of performing an initial uplink configuration that the low-power UE may receive in the SIB1 that the low-power UE is expected to receive. Specifically, the embodiment 3 may be divided into an uplink configuration method when the low-power UE is also expected to receive, and an uplink configuration method when only the low-power UE is expected to receive.

① Uplink Configuration in the SIB Received in Common by the Low-Power UE and the General UE In general, in most cases, the downlink SIB1 comes within a band that the low-power UE may receive. Through this, the uplink configuration in the SIB1 may be divided into two and performed. In particular, a transmission region of a new SIBx to be transmitted may be configured only in the case of the low-power UE. In this case, the uplink configuration for the low-power UE may be configured to be transmitted in the corresponding SIBx.

② Uplink Configuration in the SIB that only the Low-Power UE Receives

With respect to the low-power UE, the uplink may be configured in the SIB that only the low-power UE receives. This may be the SIB1 delivered through the above-described embodiments 1 and 2, and may be SIBx delivered through the first method of the above-described embodiment 3. The uplink configuration configured through the corresponding SIB is subject to parameter restrictions so that the width of the frequency band is within a specific value in the standard.

Embodiment 4. Random Access Method to Inform that a UE is the Low-Power UE at the Time of Initial Access The embodiment 4 is a method to inform that a UE is the low-power UE at the time of the initial access so that the base station recognizes in advance that the low-power UE is connected to the network and does not perform the up/downlink configuration that exceeds the allowable range for the accessed UE in advance. Specifically, the embodiment 4 includes a method of determining the low-power UE from the viewpoint of a base station and a method of determining the low-power UE from a UE point of view.

① Determining the Low-Power UE from a Base Station Point of View

For the low-power UE, by separately defining a PRACH region provided to the corresponding UE, the base station may know that the UE transmitted the RACH preamble through the corresponding resource region is the low-power UE without special notice or information. In particular, the PRACH defined through the rach-Config information delivered through the second method of the above-described embodiment 3 may be predefined as a space accessed only by low-power UEs.

② Determining the Low-Power UE from a UE Point of View

For the low-power UE, it is a method of allowing the corresponding UE to notify the base station that it is the low-power UE. To this end, the PRACH sequence used by the low-power UE may be configured differently, or related information may be multiplexed into the specific PUSCH region such as the MSG3 PUSCH region.

The methods provided in the present disclosure may be applied independently, or the method may be operated in combination in any form. In addition, in the case of a new term, an arbitrary name that is easy to understand the meaning of the term used in the present disclosure is used, and the embodiments of the present disclosure may be applied even when other terms having the same meaning are actually used.

Through the method provided in the present disclosure, a UE supporting only an operating band lower than an operating band required by a typical UE in NR may successfully perform network access.

Hereinafter, detailed description will be made with respect to the hardware structure of the UE and the base station being capable of implementing some or all of the embodiments as described with reference to FIGS. 1 to 11.

Figure 12:
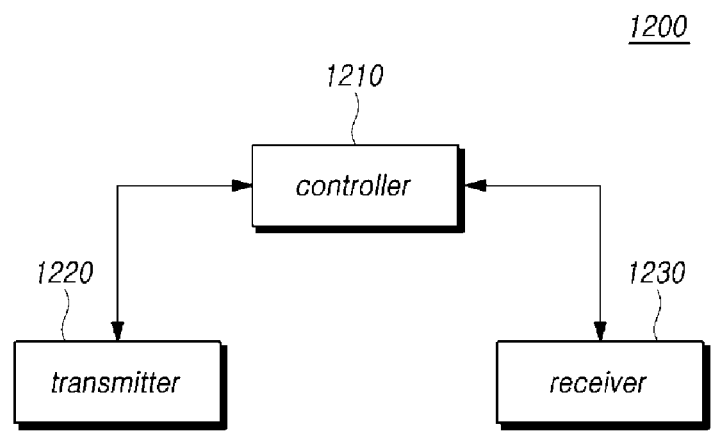
FIG. 12 is a block diagram showing a user equipment according to an embodiment.

FIG. 12 is a block diagram showing a UE 1200 according to an embodiment.

Referring now to FIG. 12, the UE 1200 according to the embodiment may include a controller 1210, a transmitter 1220, and a receiver 1230.

The controller 1210 may be a set of at least one processors and control the overall operation of the UE 1200 according to the method for performing an initial access in a limited bandwidth by the UE required to carry out the disclosed invention. The transmitter 1220 may be a circuitry and transmit uplink control information, data, and messages to a base station through a corresponding channel, and transmit sidelink control information, data, and messages to other UE through a corresponding channel. The receiver 1230 may be a circuitry and receive downlink control information, data, and messages from the base station through a corresponding channel, and receive sidelink control information, data, and messages from other UE through a corresponding channel.

The receiver 1230 may be configured to receive at least one of first configuration information which is configured for a UE having a limited bandwidth in which an available bandwidth is narrower than a predetermined bandwidth and second configuration information which is configured for a UE having the predetermined bandwidth.

In the initial access process, the receiver 1230 receives the PSS and the SSS, which are synchronization signals transmitted in downlink from each cell in order to search for the cell. The PSS/SSS is received as a synchronization signal block (SSB) together with a physical broadcast channel (PBCH). The UE receives the MIB providing information on the PDCCH-related parameters necessary for monitoring the SIB1 through the PBCH.

The receiver 1230 receives the SIB1 transmitted through the PDSCH based on the information in the MIB. The SIB1 is generally provided through the PDSCH scheduled at a period of 160 ms, and the SIB1 includes information necessary for the UE to perform initial access and scheduling related information on other system information.

The pdcch-ConfigSIB1 message in the MIB is used to configure CORESET #0 and search space #0, and an initial downlink bandwidth part may be defined and activated based on the values of CORESET #0 and search space #0. In addition, the configuration of the initial uplink bandwidth part may be made through the SIB1 scheduled using the PDCCH.

In this way, the receiver 1230 may obtain the configurations for downlink and uplink for the initial access by at least one of the MIB and the SIB1. The above description of MIB and SIB1 relates to the MIB and the SIB1 for the UE generally assumed in the NR system. In the following, the second configuration information may be used to mean the corresponding MIB and SIB1.

According to an embodiment, it is assumed that a UE performing the initial access to a cell is a UE having a limited bandwidth, in which an available bandwidth is narrower than a predetermined bandwidth. In this case, the MIB and the SIB1 in separate formats for the above-described initial access may be configured for the UE having the corresponding limited bandwidth. That is, the first configuration information may be used to mean the MIB and the SIB1 separately configured for a UE having the limited bandwidth and/or other system information.

The first configuration information includes configuration information on at least one of an initial downlink bandwidth part (initial DL BWP) and an initial uplink bandwidth part (initial UL BWP) that are separately configured for the UE having the limited bandwidth. That is, the MIB and the SIB1 and/or the other system information included in the first configuration information may be defined to configure the initial downlink bandwidth part and the initial uplink bandwidth part, separately from the existing general UE for the UE having the limited bandwidth. The existing general UE may be a typical UE having the predetermined bandwidth.

In this case, at least one of the initial downlink bandwidth part and the initial uplink bandwidth part separately configured for the UE having the limited bandwidth are configured to have a bandwidth equal to or smaller than the limited bandwidth.

Also, the first configuration information may further include information related to a random access operation performed in the initial access process. That is, the information related to the random access operation may also be separately configured for the UE having the limited bandwidth.

According to an embodiment, the initial uplink bandwidth part separately configured for the UE having the limited bandwidth includes at least one random access channel occasions or RACH occasions separately configured for the UE having the limited bandwidth. Preamble transmission may occur within a slot configured as a RACH slot for every RACH configuration period. There may be K RACH occasions within this RACH slot. In this regard, for the UE having the limited bandwidth, the RACH occasions may be configured based on the bandwidth of the initial uplink bandwidth part configured in the corresponding UE.

The first configuration information includes information on a random access channel resource configured based on a sequence separately configured for the UE having the limited bandwidth. That is, the random access channel resource may be configured for the UE having the limited bandwidth by applying a separate sequence. That is, the sequence applied to generate a random access preamble may be applied as a sequence different from that of the general UE assumed in the NR system.

According to an embodiment, the first configuration information may be configured to be received not only by the UE having the limited bandwidth but also by the general UE assumed in the NR system. According to another embodiment, the first configuration information may be configured to be received only by the UE having the limited bandwidth. In addition, the second configuration information may be configured not to be received by the UE having the limited bandwidth.

The controller 1210 may be configured to perform an initial access based on any one of the first configuration information and the second configuration information.

According to an embodiment, the first configuration information and the second configuration information may be defined separately from each other. According to another embodiment, it may be defined that a configuration information corresponding to the first configuration information is selected according to a value of an arbitrary field in the second configuration information. According to still another embodiment, in the second configuration information, a configuration information corresponding to the first configuration information may be defined to be separately added.

In the case of the general UE assumed in the NR system, the controller 1210 may perform the initial access procedure based on the second configuration information.

In the case of the UE having the limited bandwidth, the controller 1210 may perform the initial access procedure based on the first configuration information. That is, the controller 1210 may perform the initial access according to the configuration information corresponding to the first configuration information.

Also, the controller 1210 may generate the random access preamble by applying a separate sequence or transmit it through at least one separately configured random access channel occasion. In this case, the base station may determine that the corresponding UE is the UE having the limited bandwidth without additional information, and then perform the random access operation.

The UE for performing the initial access according to an embodiment may perform the initial access in the limited bandwidth with respect to the UE having the limited bandwidth in which the available bandwidth is narrower than the predetermined bandwidth in the NR system.

Figure 13:
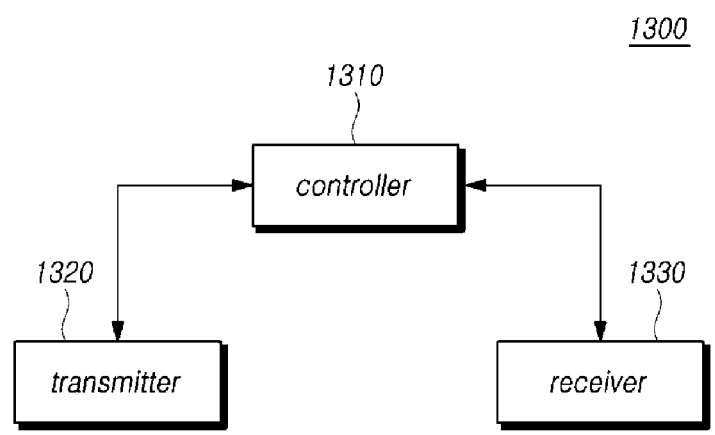
FIG. 13 is a block diagram showing a base station according to an embodiment.

FIG. 13 is a block diagram showing a base station 1300 according to an embodiment.

Referring now to FIG. 13, the base station 1300 according to the embodiment may include a controller 1310, a transmitter 1320, and a receiver 1330.

The controller 1310 may be a set of at least one processors and control the overall operation of the base station 1300 according to the above-described method required for the base station to perform a random access procedure for coverage enhancement.

The transmitter 1320 may be a circuitry and configured to transmit at least one of first configuration information which is configured for a UE having a limited bandwidth in which an available bandwidth is narrower than a predetermined bandwidth and second configuration information which is configured for a UE (e.g., general UE or typical UE) having the predetermined bandwidth.

In the initial access process, the base station transmits the PSS and the SSS, which are synchronization signals so that the UE may search for the cell. The PSS/SSS is received as a synchronization signal block (SSB) together with a physical broadcast channel (PBCH). The base station transmits the MIB providing information on the PDCCH-related parameters necessary for monitoring the SIB1 through the PBCH.

The transmitter 1320 transmits the SIB1 transmitted through the PDSCH based on the information in the MIB. The SIB1 is generally provided through the PDSCH scheduled at a period of 160 ms, and the SIB1 includes information necessary for the UE to perform the initial access and scheduling related information on other system information.

The pdcch-ConfigSIB1 message in the MIB is used to configure CORESET #0 and search space #0, and an initial downlink bandwidth part may be defined and activated based on the values of CORESET #0 and search space #0. In addition, the configuration of the initial uplink bandwidth part may be made through the SIB1 scheduled using the PDCCH.

In this way, the transmitter 1320 may transmit the configurations for downlink and uplink for the initial access by at least one of the MIB and the SIB1. The above description of MIB and SIB1 relates to the MIB and the SIB1 for the UE generally assumed in the NR system. In the following, the second configuration information may be used to mean the corresponding MIB and SIB1.

According to an embodiment, it is assumed that a UE performing the initial access to a cell is a UE having a limited bandwidth, in which an available bandwidth is narrower than a predetermined bandwidth. In this case, the MIB and the SIB1 in separate formats for the above-described initial access may be configured for the UE having the corresponding limited bandwidth. That is, the first configuration information may be used to mean the MIB and the SIB1 separately configured for a UE having the limited bandwidth and/or other system information.

The first configuration information includes configuration information on at least one of an initial downlink bandwidth part (initial DL BWP) and an initial uplink bandwidth part (initial UL BWP) that are separately configured for the UE having the limited bandwidth. That is, the MIB and the SIB1 and/or the other system information included in the first configuration information may be defined to configure the initial downlink bandwidth part and the initial uplink bandwidth part, separately from the existing general UE for the UE having the limited bandwidth. The existing general UE may be a typical UE having the predetermined bandwidth.

In this case, at least one of the initial downlink bandwidth part and the initial uplink bandwidth part separately configured for the UE having the limited bandwidth are configured to have a bandwidth equal to or smaller than the limited bandwidth.

Also, the first configuration information may further include information related to a random access operation performed in the initial access process. That is, the information related to the random access operation may also be separately configured for the UE having the limited bandwidth.

According to an embodiment, the initial uplink bandwidth part separately configured for the UE having the limited bandwidth includes at least one random access channel occasions or RACH occasions separately configured for the UE having the limited bandwidth. Preamble transmission may occur within a slot configured as a RACH slot for every RACH configuration period. There may be K RACH occasions within this RACH slot. In this regard, for the UE having the limited bandwidth, the RACH occasions may be configured based on the bandwidth of the initial uplink bandwidth part configured in the corresponding UE.

The first configuration information includes information on a random access channel resource configured based on a sequence which is separately configured for the UE having the limited bandwidth. That is, the random access channel resource may be configured for the UE having the limited bandwidth by applying a separate sequence. That is, the sequence applied to generate a random access preamble may be applied as a sequence different from that of the general UE assumed in the NR system.

According to an embodiment, the first configuration information may be configured to be received not only by the UE having the limited bandwidth but also by the general UE assumed in the NR system. According to another embodiment, the first configuration information may be configured to be received only by the UE having the limited bandwidth. In addition, the second configuration information may be configured not to be received by the UE having the limited bandwidth.

The controller 1310 is configured to perform the initial access based on any one of the first configuration information and the second configuration information.

According to an embodiment, the first configuration information and the second configuration information may be defined separately from each other. According to another embodiment, it may be defined that a configuration information corresponding to the first configuration information is selected according to a value of an arbitrary field in the second configuration information. Alternatively, in the second configuration information, a configuration information corresponding to the first configuration information may be defined to be separately added.

In the case of the general UE assumed in the NR system, the controller 1310 may perform the initial access procedure based on the second configuration information.

In the case of the UE having the limited bandwidth, the controller 1310 may perform the initial access procedure based on the first configuration information. That is, the UE having the limited bandwidth may perform the initial access according to the configuration information corresponding to the first configuration information.

Also, the UE having the limited bandwidth may generate the random access preamble by applying a separate sequence or transmit it through at least one separately configured random access channel occasion. In this case, the controller 1310 may determine that the corresponding UE is the UE having the limited bandwidth without additional information, and then perform the random access operation.

The base station for performing the initial access according to an embodiment may perform an initial access in a limited bandwidth with respect to a UE having the limited bandwidth in which an available bandwidth is narrower than a predetermined bandwidth in the NR system.

The embodiments described above may be supported by the standard documents disclosed in at least one of the radio access systems such as IEEE 802, 3GPP, and 3GPP2. That is, the steps, configurations, and parts, which have not been described in the present embodiments, may be supported by the above-mentioned standard documents for clarifying the technical concept of the disclosure. In addition, all terms disclosed herein may be described by the standard documents configured forth above.

The above-described embodiments may be implemented by any of various means. For example, the present embodiments may be implemented as hardware, firmware, software, or a combination thereof.

In the case of implementation by hardware, the method according to the present embodiments may be implemented as at least one of an application specific integrated circuit (ASIC), a digital signal processor (DSP), a digital signal processing device (DSPD), a programmable logic device (PLD), a field programmable gate array (FPGA), a processor, a controller, a microcontroller, or a microprocessor.

In the case of implementation by firmware or software, the method according to the present embodiments may be implemented in the form of an apparatus, a procedure, or a function for performing the functions or operations described above. Software code may be stored in a memory unit, and may be driven by the processor. The memory unit may be provided inside or outside the processor, and may exchange data with the processor by any of various well-known means.

In addition, the terms "system", "processor", "controller", "component", "module", "interface", "model", "unit", and the like may generally mean computer-related entity hardware, a combination of hardware and software, software, or running software. For example, the above-described components may be, but are not limited to, a process driven by a processor, a processor, a controller, a control processor, an entity, an execution thread, a program and/or a computer. For example, both the application that is running in a controller or a processor and the controller or the processor may be components. One or more components may be provided in a process and/or an execution thread, and the components may be provided in a single device (e.g., a system, a computing device, etc.), or may be distributed over two or more devices.

The above embodiments of the present disclosure have been described only for illustrative purposes, and those skilled in the art will appreciate that various modifications and changes may be made thereto without departing from the scope and spirit of the disclosure. Further, the embodiments of the disclosure are not intended to limit, but are intended to illustrate the technical idea of the disclosure, and therefore the scope of the technical idea of the disclosure is not limited by these embodiments. The scope of the present disclosure shall be construed on the basis of the accompanying claims in such a manner that all of the technical ideas included within the scope equivalent to the claims belong to the present disclosure.

What is claimed is:

1. A method of a user equipment (UE) for performing an initial access, the method comprising:
   receiving at least one of i) first configuration information which is configured for a UE having a limited bandwidth in which an available bandwidth is narrower than a predetermined bandwidth and ii) second configuration information which is configured for a UE having the predetermined bandwidth; and
   performing an initial access based on one of the first configuration information and the second configuration information,
   wherein the first configuration information comprises information on a random access channel resource configured based on a sequence separately configured for the UE having the limited bandwidth.

2. The method according to claim 1, wherein the first configuration information comprises configuration information on an initial uplink bandwidth part (initial UL BWP) that are separately configured for the UE having the limited bandwidth.

3. The method according to claim 2, wherein the initial uplink bandwidth part separately configured for the UE having the limited bandwidth are configured to have a bandwidth equal to or smaller than the limited bandwidth.

4. The method according to claim 2, wherein the initial uplink bandwidth part separately configured for the UE having the limited bandwidth comprises at least one random access channel occasions separately configured for the UE having the limited bandwidth.

5. A method of a base station for performing an initial access in a limited bandwidth, the method comprising:
   transmitting at least one of i) first configuration information which is configured for a UE having a limited bandwidth in which an available bandwidth is narrower than a predetermined bandwidth and ii) second configuration information which is configured for a UE having the predetermined bandwidth; and
   performing an initial access based on one of the first configuration information and the second configuration information,
   wherein the first configuration information comprises information on a random access channel resource configured based on a sequence separately configured for the UE having the limited bandwidth.

6. The method according to claim 5, wherein the first configuration information comprises configuration information on an initial uplink bandwidth part (initial UL BWP) that are separately configured for the UE having the limited bandwidth.

7. The method according to claim 6, wherein the initial uplink bandwidth part separately configured for the UE having the limited bandwidth are configured to have a bandwidth equal to or smaller than the limited bandwidth.

8. The method according to claim 6, wherein the initial uplink bandwidth part separately configured for the UE having the limited bandwidth comprises at least one random access channel occasions separately configured for the UE having the limited bandwidth.

9. A user equipment (UE) for performing an initial access in a limited bandwidth, the user equipment comprising:
   a receiver configured to receive at least one of i) first configuration information which is configured for a UE having a limited bandwidth in which an available bandwidth is narrower than a predetermined bandwidth and ii) second configuration information which is configured for a UE having the predetermined bandwidth; and a controller configured to perform an initial access based on one of the first configuration information and the second configuration information, wherein the first configuration information comprises information on a random access channel resource configured based on a sequence separately configured for the UE having the limited bandwidth.

10. The UE according to claim 9, wherein the first configuration information comprises configuration information on an initial uplink bandwidth part (initial UL BWP) that are separately configured for the UE having the limited bandwidth.

11. The UE according to claim 10, wherein the initial uplink bandwidth part separately configured for the UE having the limited bandwidth are configured to have a bandwidth equal to or smaller than the limited bandwidth.

12. The UE according to claim 10, wherein the initial uplink bandwidth part separately configured for the UE having the limited bandwidth comprises at least one random access channel occasions separately configured for the UE having the limited bandwidth.

* * * * *